United States Patent
Yang

(10) Patent No.: US 11,206,565 B2
(45) Date of Patent: Dec. 21, 2021

(54) MEASUREMENT METHOD AND RELATED PRODUCT

(71) Applicant: GUANGDONG OPPO MOBILE TELECOMMUNICATIONS CORP., LTD., Guangdong (CN)

(72) Inventor: Ning Yang, Guangdong (CN)

(73) Assignee: SHENZHEN HEYTAP TECHNOLOGY CORP., LTD., Shenzhen (CN)

( * ) Notice: Subject to any disclaimer, the term of this patent is extended or adjusted under 35 U.S.C. 154(b) by 22 days.

(21) Appl. No.: 16/610,775

(22) PCT Filed: Jun. 9, 2017

(86) PCT No.: PCT/CN2017/087825
§ 371 (c)(1),
(2) Date: Nov. 4, 2019

(87) PCT Pub. No.: WO2018/223404
PCT Pub. Date: Dec. 13, 2018

(65) Prior Publication Data
US 2020/0145863 A1    May 7, 2020

(51) Int. Cl.
*H04W 24/10* (2009.01)
*H04W 36/00* (2009.01)
*H04W 16/28* (2009.01)

(52) U.S. Cl.
CPC .................. *H04W 24/10* (2013.01)

(58) Field of Classification Search
None
See application file for complete search history.

(56) References Cited

U.S. PATENT DOCUMENTS

| | | | |
|---|---|---|---|
| 2018/0049081 A1* | 2/2018 | Tseng | H04W 24/10 |
| 2018/0115361 A1* | 4/2018 | Li | H04W 72/046 |
| 2018/0279151 A1* | 9/2018 | Tseng | H04W 24/10 |
| 2018/0324687 A1* | 11/2018 | Chen | H04W 48/20 |
| 2019/0268782 A1* | 8/2019 | Martin | H04W 16/28 |

(Continued)

FOREIGN PATENT DOCUMENTS

| | | |
|---|---|---|
| CN | 102056211 A | 5/2011 |
| CN | 102056217 A | 5/2011 |
| CN | 105072643 A | 11/2015 |

(Continued)

OTHER PUBLICATIONS

Tseng, U.S. Appl. No. 62/475,948, filed Mar. 24, 2017 (Year: 2017).*

(Continued)

*Primary Examiner* — Jay L Vogel
(74) *Attorney, Agent, or Firm* — Young Basile Hanlon & MacFarlane, P.C.

(57) ABSTRACT

A measurement method and related product are provided in implementations of the present disclosure. The method includes: acquiring a measurement threshold, by a user equipment, wherein the measurement threshold is related to at least one of a cell quality or a number of first beams; and performing a measurement, by the user equipment, when a measurement threshold requirement is met. By adopting implementations of the present disclosure, the UE may perform a measurement in time if necessary.

14 Claims, 4 Drawing Sheets

(56) References Cited

U.S. PATENT DOCUMENTS

2020/0008092 A1* 1/2020 Geng .................... H04L 5/0057

FOREIGN PATENT DOCUMENTS

| CN | 106576265 A | 4/2017 |
|---|---|---|
| IN | 201634035196 A | 5/2017 |
| WO | 2014096532 A1 | 6/2014 |

OTHER PUBLICATIONS

Chen, U.S. Appl. No. 62/501,774, filed May 5, 2017 (Year: 2017).*
3GPP TSG-RAN WG2 #98; Hangzhou, P.R. of China, May 15-19, 2017; R2-1704100.
3GPP TSG-RAN WG2#98; Hangzhou, China, May 15-19, 2017; R2-1704874.
3GPP TSG-RAN WG2 Meeting #98; Hangzhou, China, USA, May 15-19, 2017; R2-1704876.
3GPP TSG RAN WG2 Meeting #98; Hangzhou, China, May 15-19, 2017; R2-1704766.
3GPP TSG-RAN WG2 Meeting #98; Hangzhou, China, May 15-19, 2017; R2-1705793.
3GPP TSG-RAN WG2 Meeting #98; R2-1704534; Hangzhou, China, May 15-19, 2017; R2-1704534 (Revision of R2-1702772).
European Extended Search Report for European Application No. 17913038.0 dated Mar. 13, 2020.
3GPP TSG-RAN WG2 Meeting #98; R2-1705785; Considerations on threshold for deriving cell quality; pp. 1-5; Hangzhou, China, May 15-19, 2017.
3GPP TSG RAN WG2 Meeting #98: R2-1704832; RRM Measurements open issues; pp. 1-7; Hangzhou, China, May 15-19, 2017.
3GPP TSG-RAN WG2 Meeting #98; R2-1704528; Neighbouring Cell Measurement Threshold for NR Mobility; pp. 1-2; Hangzhou, China, May 15-19, 2017.
India First Examination Report for IN Application 201917044858 dated Feb. 12, 2021.
Communication pursuant to Article 94(3) EPC for EP Application 17913038.0 dated Jul. 1, 2021. (3 pages).
Korean Office Action with English Translation for KR Application 10-2019-7032882 dated May 21, 2021. (18 pages).

* cited by examiner

MEASUREMENT METHOD AND RELATED PRODUCT

CROSS-REFERENCE TO RELATED APPLICATION(S)

This application is a 371 application of International Application No. PCT/CN2017/087825, filed on Jun. 9, 2017, the entire disclosure of which is hereby incorporated by reference.

TECHNICAL FIELD

The present disclosure relates to a technical field of communication, in particular to a measurement method and a related product.

BACKGROUND

In a Fifth generation mobile communication technology (5G) or a New Radio (NR), due to introduction of more beams, a situation that a beam is invisible to a User Equipment (UE) in a traditional cell is changed. In the 5G or the NR, a UE may distinguish not only a cell but also a beam where the UE resides or is served.

In a Long Term Evolution (LTE), in order to prevent a UE from making frequent measurements, a network may configure the UE with a threshold (s-Measure) for performing a measurement. In a protocol standard of the LTE, the s-Measure is defined as when the UE is required to perform a measurement. In the 5G or the NR, performing a measurement based on the s-Measure has been supported. When a serving cell quality is higher than the s-Measure, the UE is not required to measure IDLE RS and CSI-RS of a neighbor cell. However, due to introduction of beams, it may be not sufficient to perform a measurement only based on the s-Measure (including a same frequency measurement and a different frequency measurement). Therefore, in the 5G or the NR, how to make a UE perform a measurement in time if necessary is a technical problem to be solved.

SUMMARY

Implementations of the present disclosure provide a measurement method and a related product.

In a first aspect, a measurement method is provided by an implementation of the present disclosure, the measurement method includes: acquiring a measurement threshold, by a user equipment, wherein the measurement threshold is related to a cell quality and/or a number of first beams; and performing a measurement, by the user equipment, when a measurement threshold requirement is met.

In a second aspect, a measurement method is provided by an implementation of the present disclosure, the measurement method includes: sending a configured measurement threshold, by a network device, wherein the measurement threshold is related to a cell quality and/or a number of first beams, and the measurement threshold is used for a user equipment to determine whether to perform a measurement.

In a third aspect, a user equipment is provided by an implementation of the present disclosure, the user equipment includes a processing unit, wherein the processing unit is used for acquiring a measurement threshold, the measurement threshold is related to a cell quality and/or a number of first beams; when a measurement threshold requirement is met, the user equipment performs a measurement.

In a fourth aspect, a network device is provided by an implementation of the present disclosure, the network device includes a communication unit and a processing unit, wherein the processing unit is used for sending a configured measurement threshold through the communication unit, the measurement threshold is related to a cell quality and/or a number of first beams, and the measurement threshold is used for a user equipment to determine whether to perform a measurement.

In a fifth aspect, a user equipment is provided by an implementation of the present disclosure, the user equipment includes one or more processors, one or more storages, one or more transceivers, and one or more programs; the one or more programs are stored in the one or more storages, and configured to be executed by the one or more processors; the program includes instructions for performing acts in the method according to the first aspect of the implementation of the present disclosure.

In a sixth aspect, a network device is provided by an implementation of the present disclosure, the network device includes one or more processors, one or more storages, one or more transceivers, and one or more programs; the one or more programs are stored in the one or more storages, and configured to be executed by the one or more processors; the program includes instructions for performing the acts in the method according to the second aspect of the implementation of the present disclosure.

In a seventh aspect, a computer-readable storage medium is provided by an implementation of the present disclosure. The computer-readable storage medium stores a computer program for electronic data interchange. The computer program enables a computer to perform the method as described in the first aspect of the implementation of the present disclosure.

In an eighth aspect, a computer-readable storage medium is provided by an implementation of the present application. The computer-readable storage medium stores a computer program for electronic data interchange. The computer program enables a computer to perform the method as described in the second aspect of the implementation of the present disclosure.

In a ninth aspect, a computer program product is provided by an implementation of the present disclosure. The computer program product includes a non-transitory computer-readable medium storing a computer program. The computer program is operable to enable a computer to perform the method as described in the first aspect of the implementation of the present disclosure.

In a tenth aspect, a computer program product is provided by an implementation of the present disclosure. The computer program product includes a non-transitory computer-readable medium storing a computer programs. The computer program is operable to enable a computer to perform the method as described in the second aspect of the implementation of the present disclosure.

It can be seen that in the present solution, a configured measurement threshold is related to a cell quality and/or the number of beams. Before performing a measurement, a user equipment may not only refer to the cell quality but also refer to the number of beams.

These and other aspects of the present application will be more easily understood from following description of implementations.

BRIEF DESCRIPTION OF DRAWINGS

In order to explain the technical solutions of implementations of the present disclosure more clearly, drawings referred to in the description of the implementations will be briefly introduced below. Apparently, the drawings in the following description are only some implementations of the present disclosure. For those of ordinary skill in the art, other drawings may be obtained according to those drawings without paying an inventive effort.

DETAILED DESCRIPTION

In order to make a skilled person in the art understand solutions of the present application better, technical solutions in implementations of the present application will be described clearly and completely below with reference to the drawings in the implementations of the present application. Apparently, the described implementations are only part, but not all, of the implementations of the present application. According to the implementations of the present application, all other implementations achieved by a person of ordinary skill in the art without paying an inventive effort should be within the protection scope of the present application.

Details are given below separately.

Terms "first", "second", "third" and "fourth", or the like in the description, claims and drawings of the present application are used to distinguish different objects but not used to describe a specific order. In addition, terms "include" and "have" and any variations thereof are intended to cover non-exclusive inclusion. For example, a process, method, system, product, or device that includes a series of acts or units is not limited to the listed acts or units, but optionally also includes acts or units that are not listed, or optionally also includes other acts or units that are inherent to the process, method, product, or device.

An "implementation" mentioned in this document means that a particular feature, structure, or characteristic described in combination with the implementation may be included in at least one implementation of the present application. The appearance of the phrase in various places in the specification does not necessarily refer to the same implementation, nor is it an independent or alternative implementation mutually exclusive with other implementations. It is explicitly and implicitly understood by one skilled person in the art that implementations described in this document may be combined with other implementations.

Implementations of the present application will be described below with reference to the accompanying drawings.

Figure 1:
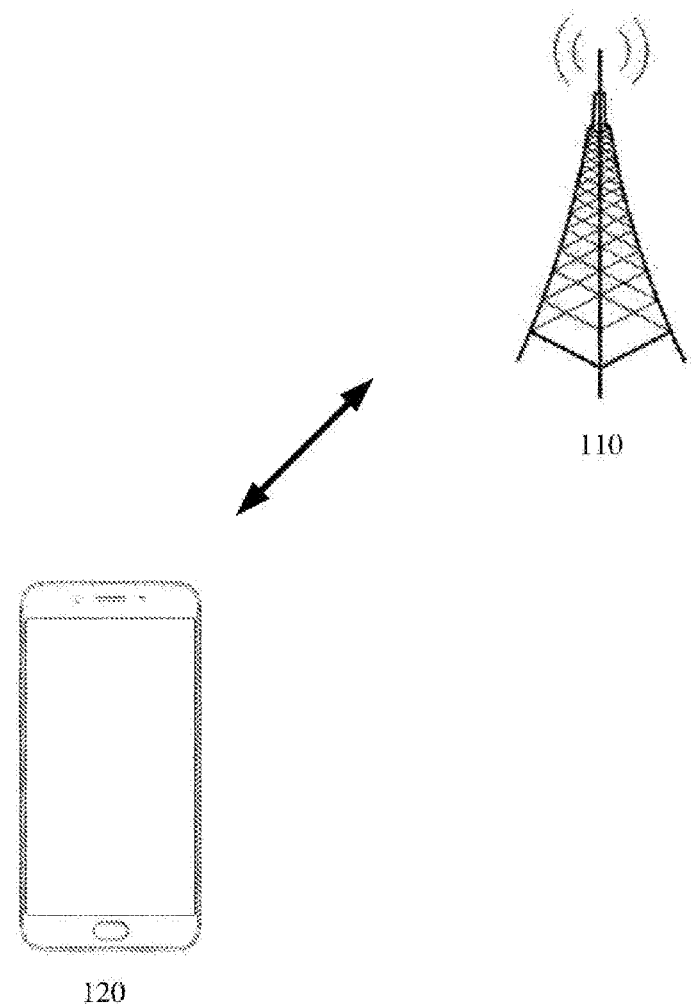
FIG. 1 is a schematic diagram of a network architecture provided by an implementation of the present disclosure.

Refer to FIG. 1. FIG. 1 is a schematic diagram of a network architecture disclosed in an implementation of the present application. The network architecture shown in FIG. 1 includes a user equipment 120 and a network device 110. In the 5G or the NR, performing a measurement with s-Measure has been supported. The definition of s-Measure is that when a serving cell quality is higher than s-Measure, a user equipment is not required to measure IDLE RS and CSI-RS of a neighbor cell. However, due to introduction of beams, it may be not sufficient to perform a measurement only based on the s-Measure.

Therefore, in the present solution, a configured measurement threshold is related to a cell quality and/or the number of beams. Before performing a measurement, a user equipment may not only refer to the cell quality but also refer to the number of beams. Compared with a case of only referring to the cell quality, the present solution refers to more parameters, so that the user equipment may determine whether to perform a measurement more comprehensively and thus the user equipment may perform a measurement in time if necessary.

The measurement threshold may be configured by the network device 110 to the user equipment 120, or predetermined in a protocol, etc.

The number of beams mentioned above is the number of qualified beams.

Specifically, the number of beams with beam qualities being higher than a beam quality threshold is the number of qualified beams. For example, there are 10 beams in a serving cell, and quality of each of 5 beams among those 10 beams is higher than the beam quality threshold, then the number of qualified beams is 5.

If the measurement threshold only considers the serving cell quality, a following situation may occur: only one beam is qualified in the serving cell, but the serving cell quality is higher than a measurement threshold, and a user equipment will not perform a measurement. However, due to some reason such as a moving speed of the user equipment, if the qualified beam fails, the user equipment may be likely to experience radio link failure.

Therefore, in the present solution, a configured measurement threshold is related to a cell quality and/or the number of qualified beams. Before performing a measurement, a user equipment may not only refer to the serving cell quality but also refer to the number of qualified beams, thus avoiding a situation that there is only one qualified beam in a serving cell, but the serving cell quality is higher than a measurement threshold, such that the user equipment performs a measurement in time if necessary, thus ensuring timeliness of cell measurement.

A User Equipment (UE) is a device that provides voice and/or data connectivity to a user, such as a handheld device and a vehicle-mounted device with a wireless connection function. A general user equipment includes, for example, a mobile phone, a tablet computer, a notebook computer, a palm computer, a mobile internet device (MID), a wearable device such as a smart watch, a smart bracelet, or a pedometer.

A network device refers to a node device at a network side. For example, a network device may be a Radio Access Network (RAN) device at an access network side in a cellular network. The so-called RAN device is a device that connects a user equipment to a wireless network, including but not limited to: an Evolved Node B (eNB), a radio network controller (RNC), a Node B (NB), a Base Station Controller (BSC), a Base Transceiver Station (BTS), a Home Base Station (e.g., a Home evolved NodeB, or a Home Node B, HNB), a BaseBand Unit (BBU), or a Mobility Management Entity (MME). For another example, a network device may be a node device in a Wireless Local Area Network (WLAN), such as an access controller (AC), a gateway, or a WIFI Access Point (AP).

Below, a measurement method provided by an implementation of the present application will be described in detail in combination with the network architecture shown in FIG. 1.

Figure 2:
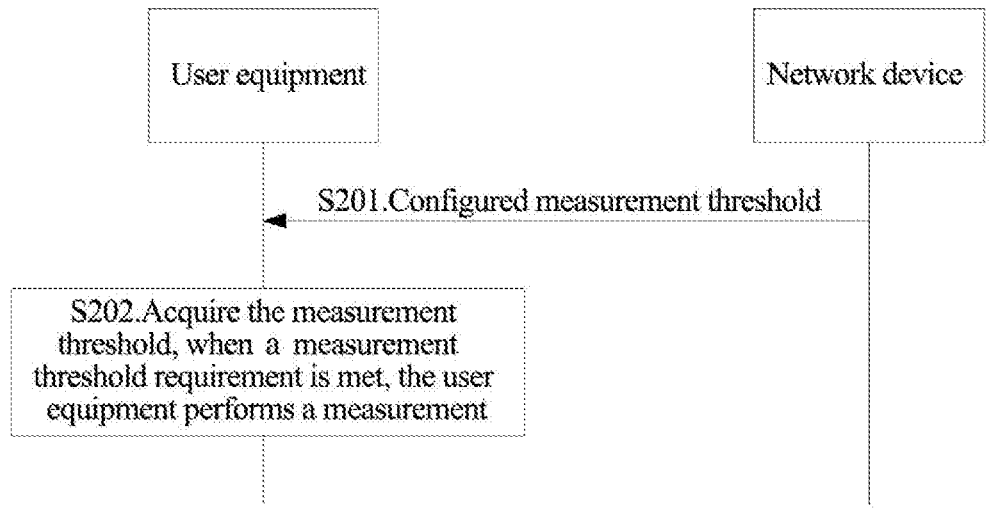
FIG. 2 is a flow chart of a measurement method provided by an implementation of the present disclosure.

Refer to FIG. 2. FIG. 2 is a schematic flowchart of a measurement method provided by an implementation of the present application, and the method includes following acts S201 and S202.

In act S201, a network device sends a configured measurement threshold, the measurement threshold is related to a cell quality and/or a number of first beams.

In act S202, a user equipment acquires the measurement threshold, and when a measurement threshold requirement is met, the user equipment performs a measurement.

It should be explained that although the measurement method shown in FIG. 2 is performed under a condition that the measurement threshold is configured by a network device, following contents are applicable regardless of whether the measurement threshold is configured by a network device or is predetermined in a protocol.

Specifically, in the 5G or the NR, performing a measurement based on the s-Measure has been supported. The definition of s-Measure is that when a serving cell quality is higher than the s-Measure, a UE is not required to measure IDLE RS and CSI-RS of a neighbor cell. However, due to introduction of beams, it may be not sufficient to perform a measurement only based on the s-Measure. Therefore, in the present solution, a configured measurement threshold is related to a cell quality and/or the number of beams. Before performing a measurement, the user equipment may not only refer to the cell quality but also refer to the number of beams. Compared with a case of only referring to the cell quality, the present solution refers to more parameters, so that the user equipment may determine whether to perform a measurement more comprehensively and thus the user equipment may perform a measurement in time if necessary.

In an example, the number of first beams is the number of qualified beams.

Specifically, the number of beams with beam qualities being higher than a beam quality threshold is the number of qualified beams. For example, there are 10 beams in a serving cell, and quality of each of 5 beams among those 10 beams is higher than the beam quality threshold, then the number of qualified beams is 5.

Specifically, if a measurement threshold only considers a serving cell quality, a following situation may occur: only one beam is qualified in the serving cell, but the serving cell quality is higher than a measurement threshold, and a user equipment will not perform a measurement. However, due to some reason such as a moving speed of the user equipment, if the qualified beam fails, the user equipment may be likely to experience radio link failure. Therefore, in the present solution, a configured measurement threshold is related to a cell quality and/or the number of qualified beams. Before performing a measurement, a user equipment may not only refer to the serving cell quality but also refer to the number of qualified beams, thus avoiding a situation that the quality of only one beam in the serving cell meets the requirement, but the serving cell quality is higher than a measurement threshold, such that the user equipment performs a measurement in time if necessary, thus ensuring timeliness of cell measurement.

In an example, when the number of first beams is larger than a first threshold, the measurement threshold is related to a cell quality measurement threshold.

The first threshold is configured by a network device, or the first threshold is predetermined by a protocol.

Specifically, when the number of first beams is larger than the first threshold, the measurement threshold=the cell quality measurement threshold.

Specifically, as the number of first beams is the number of qualified beams, that is, the number of beams with beam qualities being higher than a beam quality threshold. If the first threshold is 10, there are 10 beams with quality being higher than a beam quality threshold in a serving cell currently. If the serving cell quality is higher than the measurement threshold at this time, a radio link failure can hardly be caused by a reason such as a moving speed of the user equipment even if the user equipment does not perform a measurement. Therefore, when the number of first beams is larger than a certain value, for the measurement threshold of the user equipment, the cell quality may only be considered.

In an example, the measurement threshold is related to the cell quality measurement threshold and an offset, and the offset is a function of the number of first beams.

Specifically, the measurement threshold=the cell quality measurement threshold±the offset, the offset=F (the number of first beams), F is a function.

Further, the offset is related to the number of first beams and a number of second beams, wherein the number of first beams is the number of qualified beams, and the number of second beams is the number of beams that is sent by a network device.

The number of second beams is the number of beams that is sent by the network device, referring to the total number of beams that are actually supported by the cell in which the network device is located. For example, if the total number of beams supported by the cell in which the network device is located is 10, then M=10.

Specifically, the offset=the cell quality measurement threshold*(the number of first beams/the number of second beams), then the measurement threshold=the cell quality measurement threshold+the cell quality measurement threshold*(the number of first beams/the number of second beams). For example, assuming that the cell quality measurement threshold is s-Measure$_{cell\ quality}$, the number of first beams=10, and the number of second beams=20, then the measurement threshold=s-Measure$_{cell\ quality}$+s-Measure$_{cell\ quality}$ (10/20).

The number of second beams is sent by a network device to a user equipment through system information or synchronization information.

In an example, the system information includes Common Resource Configuration information.

Specifically, 1-bit information may be set (or added) in the common resource configuration information, and the 1-bit information is the number of second beams. For example, if the 1-bit information is 10, the number of second beams=10, and if the 1-bit information is 30, the number of second beams=30.

In the current 5G/NR system, information that a user equipment must acquire when accessing a cell includes system information. A network device provides the number of second beams to the user equipment through the system information, so that scheduling signaling may be saved and the user equipment may obtain the number of second beams when accessing the cell.

In addition, as a measurement of beam quality of a cell is for cell searching, and a purpose of cell searching is to ensure that a user equipment obtains time synchronization and frequency synchronization of the system, the user equipment will receive synchronization information in a process of cell searching, so a network device provides the number of second beams to a user equipment through synchronization information, so that scheduling signaling may be saved and the user equipment may obtain the number of second beams at beginning.

Further, when the number of first beams is less than a second threshold, the offset is determined by the number of first beams and a mapping relationship between the number of beams and the offset.

The second threshold is configured by a network device, or the second threshold is predetermined by a protocol.

The second threshold may be the same as or different from the first threshold, which is not restricted in the present disclosure.

A mapping relationship between the number of beams and the offset is a table, and the table records an offset corresponding to each number of beams, as shown in Table 1.

TABLE 1

| Number of beams | Offset |
|---|---|
| 5 | 2 |
| 6 | 2 |
| 7 | 3 |
| 8 | 3 |
| 9 | 3 |
| 10 | 4 |
| ... | ... |

A mapping relationship between the number of beams and the offset is a table, and the table records the offset corresponding to each range of numbers of beams, as shown in Table 2.

TABLE 2

| Number of beams | Offset |
|---|---|
| 1~6 | 2 |
| 7~9 | 3 |
| 10~14 | 4 |
| 15~17 | 5 |
| 18~23 | 6 |
| ... | ... |

In an example, the mapping relationship between the number of beams and the offset is a formula, the offset=the number of beams*X, X is any number, and X is configured by a network device, or X is predetermined. For example, if X=1, when the number of first beams=5, then the offset=5.

Further, X corresponding to different numbers of beams is the same. For example, if the number of beams=3, or the number of beams=5, X is equal to 1.

Further, X corresponding to different ranges of numbers of beams is different. For example, if the number of beams=1~3, X=1, and the number of beams=4~7, X=0.5.

In an example, the mapping relationship between the number of beams and the offset is a formula, the offset=the number of beams−Y, Y is any number, and Y is configured by a network device, or Y is predetermined. For example, assuming Y=3, when the number of first beams=5, then the offset=2.

Further, Y corresponding to different numbers of beams is the same. For example, if the number of beams=5, or the number of beams=7, Y is equal to 3.

Further, Y corresponding to different ranges of numbers of beams is different. For example, assuming the number of beams=1~3, Y=5, and the number of beams=4~7, Y=3.

In an example, the mapping relationship between the number of beams and the offset is a formula, the offset=the number of beams/Z, Z is any number, and Z is configured by a network device, or Z is predetermined. For example, assuming Z=3, when the number of first beams=6, then the offset=2.

Further, Z corresponding to different numbers of beams is the same. For example, if the number of beams=6, or the number of beams=7, Z is equal to 3.

Further, Z corresponding to different ranges of numbers of beams is different. For example, if the number of beams=1~3, Z=2, and if the number of beams=4~7, Z=4.

A measurement threshold specifically is: the measurement threshold=the cell quality measurement threshold−the offset. For example, assuming that the mapping relationship between the number of beams and the offset is as shown in Table 2, the cell quality measurement threshold is s-Measure$_{cell\ quality}$, and if the number of first beams=10, then the measurement threshold=s-Measure$_{cell\ quality}$-4.

Further, the mapping relationship between the number of beams and the offset is configured by a network device to a user equipment through signaling, or the mapping relationship between the number of beams and the offset is predetermined.

Specifically, the signaling includes system information, or the signaling includes dedicated signaling. The dedicated signaling includes Reconfiguration signaling (RRC). Sending a mapping relationship between the number of beams and the offset by dedicated signaling may save signaling overhead. In addition, in the current 5G/NR system, the information that a user equipment must obtain when accessing a cell includes system information. A network device provides the mapping relation between the number of beams and the offset to a user equipment through the system information, so that scheduling signaling may be saved and the user equipment may obtain the mapping relationship between the number of beams and the offset when accessing the cell.

Further, the mapping relationship between the number of beams and the offset may be sent to a user equipment by introducing a specific Information Element (IE) in dedicated signaling.

In an example, the measurement threshold includes the cell quality measurement threshold and/or a number measurement threshold of beams. That is, the measurement threshold may include only the cell quality measurement threshold, or only the number measurement threshold of beams, or both of them.

In an example, when the measurement threshold includes the cell quality measurement threshold and the number measurement threshold of beams, if at least one of a cell quality measurement threshold requirement and a number measurement threshold requirement of beams is met, the user equipment performs a measurement.

Further, when the measurement threshold includes the cell quality measurement threshold or the number measurement threshold of beams, if the cell quality measurement threshold requirement is met, a user equipment performs a measurement, otherwise the user equipment does not perform any operation; if the number measurement threshold requirement of beams requirement is met, a user equipment performs a measurement, otherwise the user equipment does not perform any operation.

In an example, the number measurement threshold of beams is a threshold for the number of beams satisfying a beam quality threshold, and the beam quality threshold is configured by a network device, or the beam quality threshold is predetermined.

Specifically, if a serving cell quality is lower than or equal to the cell quality measurement threshold, it means that the cell quality measurement threshold requirement is met; otherwise the cell quality measurement threshold requirement is not met. For example, if a serving cell quality is A and a cell quality measurement threshold is B, if A<B, then the cell quality measurement threshold requirement is met. If the number of qualified beams is less than or equal to the number measurement threshold of beams, it means that the number measurement threshold requirement of beams is met, otherwise the number measurement threshold requirement of beams is not met. For example, assuming there are 10 beams in a serving cell, and there are 5 beams satisfying the beam quality threshold among the 10 beams, if the number measurement threshold of beams is 3, 5>3, then the number measurement threshold requirement of beams is met.

It should be explained that assuming that at least two of the measurement threshold, the first threshold, the second threshold, the mapping relationship between the number of beams and the offset, and the beam quality threshold are configured by a network device to a user equipment, the network device may directly configure the at least two kinds of information together to the user equipment. For example, the network device directly configures the at least two kinds of information together to the user equipment through system information or dedicated signaling, or, the network device may separately configure the at least two kinds of information to the user equipment. For example, the network device configures part of the at least two kinds of information to the user equipment through system information, and then configures the rest part of the at least two kinds of information to the user equipment through dedicated signaling.

Figure 3:
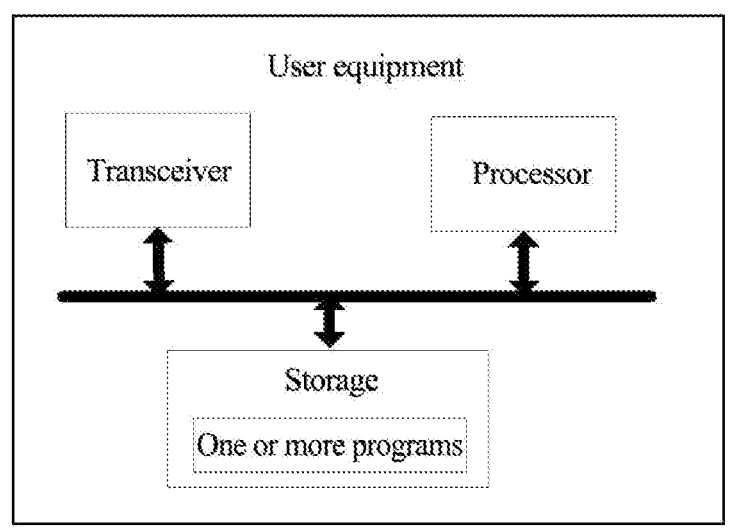
FIG. 3 is a schematic diagram of structure of a user equipment provided by an implementation of the present disclosure.

Refer to FIG. 3. FIG. 3 is a user equipment provided by an implementation of the present disclosure, including one or more processors, one or more storages, one or more transceivers, and one or more programs.

The one or more programs are stored in the one or more storages, and configured to be executed by the one or more processors.

The program includes instructions for performing following acts: acquiring a measurement threshold, wherein the measurement threshold is related to a cell quality and/or a number of first beams; and performing a measurement when the measurement threshold requirement is met.

In an example, the measurement threshold is related to a cell quality measurement threshold and an offset, and the offset is a function of the number of first beams.

In an example, when the number of first beams is larger than a first threshold, the measurement threshold is related to the cell quality measurement threshold.

In an example, the offset related to the number of first beams and a number of second beams, the number of first beams is a number of qualified beams, and the number of second beams is a number of beams sent by a network device.

In an example, when the number of first beams is less than a second threshold, the offset is determined by the number of first beams and a mapping relationship between the number of beams and the offset.

In an example, the mapping relationship between the number of beams and the offset is configured by the network device to the user equipment through signaling, or the mapping relationship between the number of beams and the offset is predetermined.

In an example, the measurement threshold includes the cell quality measurement threshold and/or a number measurement threshold of beams.

In an example, when the measurement threshold includes the cell quality measurement threshold and the number measurement threshold of beams, if at least one of a cell quality measurement threshold requirement and a number measurement threshold requirement of beams is met, the user equipment performs the measurement.

In an example, the number measurement threshold of beams is a threshold of the number of beams satisfying a beam quality threshold, and the beam quality threshold is configured by the network device, or the beam quality threshold is predetermined.

It can be seen that in the present solution, a configured measurement threshold is related to a cell quality and/or the number of beams. Before performing a measurement, a user equipment may not only refer to the cell quality but also refer to the number of beams. Compared with a case of only referring to the cell quality, the present solution refers to more parameters, so that the user equipment may determine whether to perform a measurement more comprehensively, and thus the user equipment may perform a measurement in time if necessary.

Figure 4:
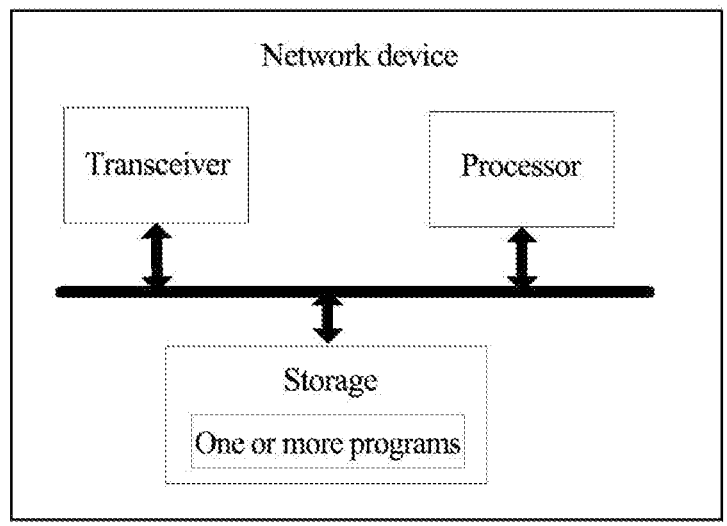
FIG. 4 is a schematic diagram of structure of a network device provided by an implementation of the present disclosure.

Refer to FIG. 4. FIG. 4 is a network device provided by an implementation of the present disclosure, including one or more processors, one or more storages, one or more transceivers, and one or more programs.

The one or more programs are stored in the one or more storages, and configured to be executed by the one or more processors.

The program includes instructions for performing following acts: sending a configured measurement threshold, wherein the measurement threshold is related to a cell quality and/or a number of first beams, the measurement threshold is used by a user equipment to determine whether to perform a measurement.

In an example, the measurement threshold is related to a cell quality measurement threshold and an offset, the offset is a function of the number of first beams.

In an example, when the number of first beams is larger than a first threshold, the measurement threshold is related to the cell quality measurement threshold.

In an example, an offset is related to the number of first beams and a number of second beams, the number of first beams is a number of qualified beams, and the number of second beams is a number of beams sent by the network device.

In an example, when the number of first beams is less than a second threshold, the offset is determined by the number of first beams and a mapping relationship between the number of beams and the offset.

In an example, the mapping relationship between the number of beams and the offset is configured by the network device to the user equipment through signaling, or the mapping relationship between the number of beams and the offset is predetermined.

In an example, the measurement threshold includes the cell quality measurement threshold and/or a number measurement threshold of beams.

In an example, when the measurement threshold includes the cell quality measurement threshold and the number measurement threshold of beams, if at least one of a cell quality measurement threshold requirement and a number measurement threshold requirement of beams is met, the user equipment performs a measurement.

In an example, the number measurement threshold of beams is a threshold of the number of beams satisfying a beam quality threshold, wherein the beam quality threshold is configured by the network device, or the beam quality threshold is predetermined.

It can be seen that in the present solution, a configured measurement threshold is related to a cell quality and/or the number of beams. Before performing a measurement, a user equipment may not only refer to the cell quality but also refer to the number of beams. Compared with a case of only referring to the cell quality, the present solution refers to more parameters, so that the user equipment may determine whether to perform a measurement more comprehensively, and thus the user equipment may perform a measurement in time if necessary.

Figure 5:
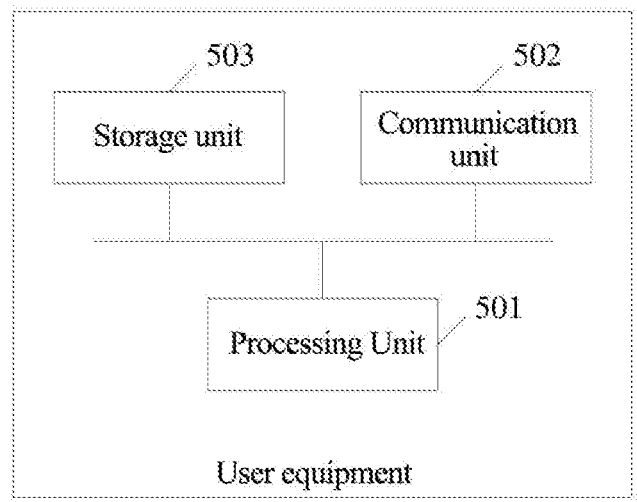
FIG. 5 is a schematic diagram of structure of another user equipment provided by an implementation of the present disclosure.

Refer to FIG. 5. FIG. 5 is a schematic diagram of structure of a user equipment according to a present implementation. The user equipment includes a processing unit 501, a communication unit 502 and a storage unit 503.

The processing unit 501 is used for acquiring a measurement threshold, wherein the measurement threshold is related to a cell quality and/or a number of first beams; and performing a measurement when a measurement threshold requirement is met.

The processing unit 501 may be a processor or a controller (For example, it may be a Central Processing Unit (CPU), a general-purpose processor, a Digital Signal Processor (DSP), an Application-Specific Integrated Circuit (ASIC), a Field Programmable Gate Array (FPGA), or another programmable logic device, transistor logic device, hardware component, or any combination thereof. The processing unit may implement or perform various illustrative logical blocks, modules, and circuits described in connection with the content disclosed in the present disclosure. The processor may also be a combination for implementing computing functions, e.g., a combination that includes one or more microprocessors, a combination of a DSP and a microprocessor, etc.). The communication unit 502 may be a transceiver, a transceiving circuit, a radio chip, a communication interface, etc., and the storage unit 503 may be a memory.

When the processing unit 501 is a processor, the communication unit 502 is a communication interface, and the storage unit 503 is a memory, a user equipment related to an implementation of the present disclosure may be the user equipment shown in FIG. 3.

Figure 6:
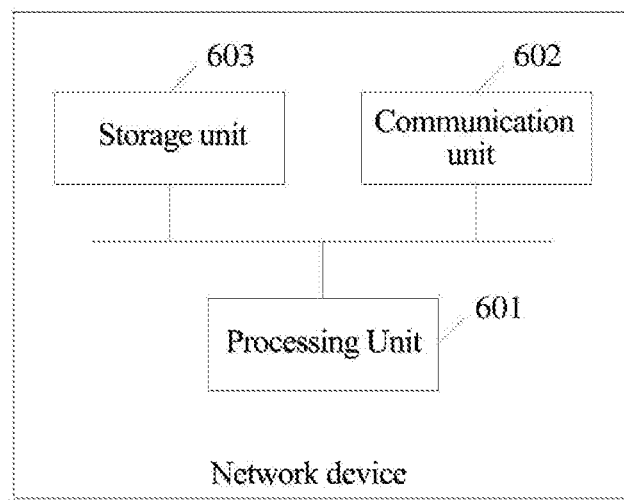
FIG. 6 is a schematic diagram of structure of another network device provided by an implementation of the present disclosure.

Refer to FIG. 6. FIG. 6 is a schematic diagram of structure of a network device according to the present implementation. The network device includes a processing unit 601, a communication unit 602, and a storage unit 603.

The processing unit 601 is used for sending a configured measurement threshold through the communication unit 602, wherein the measurement threshold is related to a cell quality and/or a number of first beams, and the measurement threshold is used by a user equipment to determine whether to perform a measurement.

The processing unit 601 may be a processor or a controller (For example, it may be a Central Processing Unit (CPU), a general-purpose processor, a Digital Signal Processor (DSP), an Application-Specific Integrated Circuit (ASIC), a Field Programmable Gate Array (FPGA), or another programmable logic device, transistor logic device, hardware component, or any combination thereof. The processing unit may implement or perform various illustrative logical blocks, modules, and circuits described in connection with the content disclosed in the present disclosure. The processor may also be a combination for implementing computing functions, e.g., a combination that includes one or more microprocessors, a combination of a DSP and a microprocessor, etc.). The communication unit 602 may be a transceiver, a transceiving circuit, a radio chip, a communication interface, etc., and the storage unit 603 may be a memory.

When the processing unit 601 is a processor, the communication unit 602 is a communication interface, and the storage unit 603 is a memory, a network device related to an implementation of the present disclosure may be the network device shown in FIG. 4.

Figure 7:
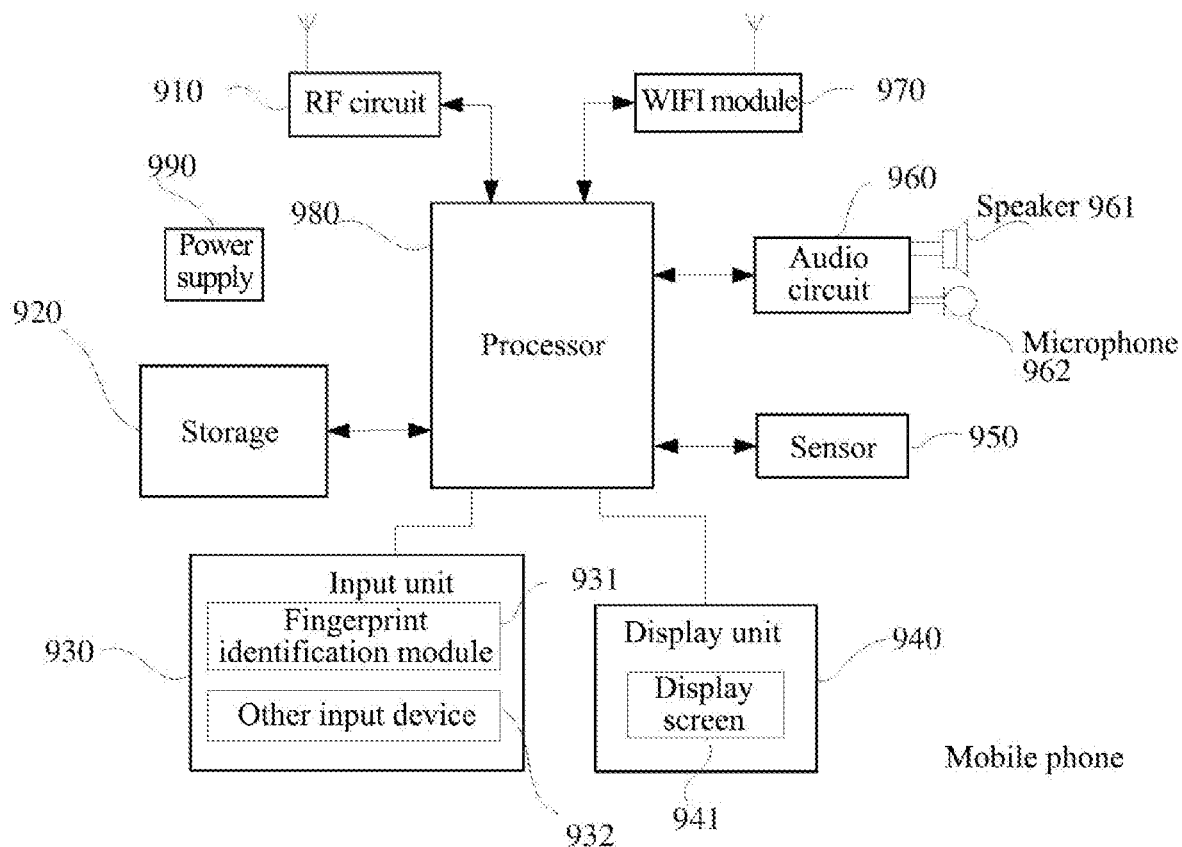
FIG. 7 is a schematic diagram of structure of another user equipment provided by an implementation of the present disclosure.

Another user equipment is further provided in an implementation of the present disclosure. As illustrated in FIG. 7, for ease of illustration, only parts related to the implementation of the present disclosure are shown, and the specific technical details which are not illustrated may refer to the part of the method according to the implementation of the present disclosure. The user equipment may be any user device such as a mobile phone, a tablet computer, a Personal Digital Assistant (PDA), a Point of Sales (POS), a vehicle-mounted computer. Below, a mobile phone is taken as an example of the user equipment.

FIG. 7 is a block diagram of a partial structure of a mobile phone related to a user equipment provided by an implementation of the present disclosure. Referring to FIG. 7, the mobile phone includes parts such as a radio frequency (RF) circuit 910, a storage 920, an input unit 930, a display unit 940, a sensor 950, an audio circuit 960, a wireless fidelity (WiFi) module 970, a processor 980, and a power supply 990. A person skilled in the art may understand that the structure of the mobile phone shown in FIG. 7 does not constitute a limitation to the mobile phone, and the mobile phone may include more or fewer parts than those shown in the figure, or some parts may be combined, or a different part arrangement may be used.

Below, each composition part of the mobile phone is specifically described with reference to FIG. 7.

The RF circuit 910 may be used to receive and send information. Generally, the RF circuit 910 includes, but is not limited to, an antenna, at least one amplifier, a transceiver, a coupler, a Low Noise Amplifier (LNA), a duplexer, and the like. In addition, the RF circuit 910 may further communicate with a network and another device via wireless communication. The wireless communication may use any communication standard or protocol, which includes, but is not limited to, a Global System for Mobile Communication (GSM), a General Packet Radio Service (GPRS), a Code Division Multiple Access (CDMA), a Wideband Code Division Multiple Access (WCDMA), a Long Term Evolution (LTE), an e-mail, a Short Messaging Service (SMS), and the like.

The storage 920 may be used for storing software programs and modules, and the processor 980 runs the software programs and modules stored in the storage 920 to perform various functional applications and data processing of the mobile phone. The storage 920 may mainly include a program storage area and a data storage area, wherein the program storage area may store an operating system, a computer program required by at least one function, and the like. The data storage area may store data or the like created according to the use of the mobile phone. In addition, the storage 920 may include a high speed random access memory, and may also include a non-volatile memory, such as at least one magnetic disk storage device, a flash memory, or other volatile solid-state storage device.

The input unit 930 may be used for receiving input digital or character information, and generating key signal inputs related to user settings and function control of the mobile phone. Specifically, the input unit 930 may include a fingerprint identification module 931 and other input device 932. The fingerprint identification module 931 may collect fingerprint data inputted by the user thereon. Besides the fingerprint identification module 931, the input unit 930 may further include other input device 932. Specifically, the other input devices 932 may include, but is not limited to, one or more of a touch control screen, a physical keyboard, a function key (for example, a volume control key, or a switch key), a track ball, a mouse, a joystick, and so on.

The display unit 940 may be used for displaying information input by the user or information provided to the user, and various menus of the mobile phone. The display unit 940 may include a display screen 941. Optionally, a Liquid Crystal Display (LCD), an Organic Light-Emitting Diode (OLED), or the like may be used for configuring the display screen 941. Although the fingerprint identification module 931 and the display screen 941 in FIG. 7 are used as two separate parts to realize the input and input function of the mobile phone, in some implementations, the fingerprint identification module 931 and the display screen 941 may be integrated to realize the input function and playing function of the mobile phone.

The mobile phone may further include at least one sensor 950, such as an optical sensor, a motion sensor or other sensor. Specifically, the optical sensor may include an ambient light sensor and a proximity sensor. The ambient light sensor may adjust the luminance of the display screen 941 according to brightness of the ambient light, and the proximity sensor may turn off the display screen 941 and/or backlight when the mobile phone is moved to the ear. As one type of motion sensor, an accelerometer sensor may detect the magnitudes of accelerations in various directions (generally triaxial), may detect the magnitude and direction of the gravity when the sensor is still, may be used in an application for identifying a gesture of a mobile phone (for example, switching between landscape and portrait, related games, and gesture calibration of a magnetometer), and a function related to vibration identification (such as a pedometer and a tap). Other sensors, for example, a gyroscope, a barometer, a hygrometer, a thermometer, and an infrared sensor, which may be configured in the mobile phone, are not repeated here.

An audio circuit 960, a speaker 961, and a microphone 962 may provide audio interfaces between the user and the mobile phone. The audio circuit 960 may transmit electrical signals converted from the received audio data to the speaker 961, and the speaker 961 may convert the electrical signals into sound signals for playing. On the other hand, the microphone 962 converts collected sound signals into electrical signals, which are received by the audio circuit 960 and then converted into audio data. After being processed by the audio data playback processor 980, the audio data is sent to another mobile phone via the RF circuit 910, or the audio data is played to the storage 920 for further processing.

WiFi is a short-range wireless transmission technology. The mobile phone may help users to send and receive e-mails, browse web pages and access streaming media and the like through WiFi module 970. The WiFi module 970 provides users with wireless broadband Internet access. Although FIG. 7 shows the WiFi module 970, it may be understood that, the WiFi module 670 is not an essential part of the mobile phone, and can be completely omitted as required without changing the essence of the present disclosure.

The processor 980 is a control center of the mobile phone, and connects various parts of the whole mobile phone by using various interfaces and circuits. By running or executing software programs and/or modules stored in the storage 920 and invoking data stored in the storage 920, the processor 680 performs various functions of the mobile phone and processes data, thereby performing overall monitoring on the mobile phone. Optionally, the processor 980 may include one or more processing units. Preferably, the processor 980 may integrate an application processor and a modulation and demodulation processor, the application processor mainly processes the operating system, user interface, application program, and so on, and the modulation and demodulation processor mainly processes wireless communication. It may be understood that, the foregoing modem processor may be not integrated into the processor 980.

The mobile phone further includes a power supply 990 (such as a battery) for supplying power to various parts. Preferably, the power supply may be logically connected to the processor 980 by using a power management system, thereby implementing functions such as charging, discharging, and power consumption management by using the power management system.

Although not shown in the figure, the mobile phone may further include a camera, a Bluetooth module, and the like, which are not repeated here.

In the foregoing implementation shown in FIG. 2, the flow at the user equipment side in various acts and methods may be implemented based on the structure of the mobile phone.

In the foregoing implementation shown in FIG. 5, functions of various units may be implemented based on the structure of the mobile phone.

An implementation of the present disclosure further provides a computer readable storage medium. The computer readable storage medium stores a computer program for electronic data interchange, and the computer program causes a computer to execute parts or all of the acts described for the user equipment in the above method implementations.

An implementation of the present disclosure also provides a computer readable storage medium. The computer readable storage medium stores a computer program for electronic data interchange, and the computer program causes a computer to execute parts or all of the acts described for the network device in the above method implementations.

An implementation of the present disclosure also provides a computer program product. The computer program product includes a non-transitory computer readable storage medium storing a computer program, and the computer program is operable to cause a computer to execute parts or all of the acts described for the user equipment in the above method. The computer program product may be a software installation package.

An implementation of the present disclosure also provides a computer program product. The computer program product includes a non-transitory computer readable storage medium storing a computer program, and the computer program is operable to cause a computer to execute parts or all of the acts described for the network device in the above method implementations. The computer program product may be a software installation package.

The acts of the method or algorithm described in implementations of the present disclosure may be implemented in hardware, or implemented in a manner of executing software instructions by a processor. The software instructions may be composed of corresponding software modules. The software modules may be stored in a Random Access Memory (RAM), a flash memory, a Read Only Memory (ROM), an Erasable Programmable Read Only Memory (EPROM), an Electrically Erasable Programmable Read Only Memory (EEPROM), a register, a hard disk, a removable hard disk, a Compact Disc Read-Only Memory (CD-ROM), or a storage medium in any other form well-known in the art. An exemplary storage medium is coupled to the processor such that the processor can read information from a storage medium, and write information to the storage medium. Of course, the storage medium may be a component of the processor. The processor and the storage medium may be located in an ASIC. In addition, the ASIC may be located in an access network device, a target network device, or a core network device. Of cause, the processor and the storage medium may also act as separate components in the access network device, the target network device, or the core network device.

Those skilled in the art should realize that in one or more examples described above, the functions described in the implementations of the present disclosure may be implemented in whole or in parts through software, hardware, firmware, or any combination thereof. When the functions described in the implementations of the present application are implemented through software, these functions may be implemented in whole or in parts in the form of a computer program product. The computer program product includes one or more computer instructions. When the computer program instructions are loaded and executed on a computer, the processes or functions are generated in whole or in parts according to the implementations of the present disclosure. The computer may be a general purpose computer, a special purpose computer, a computer network, or other programmable devices. The computer instructions may be stored in a computer-readable storage medium, or transmitted from one computer-readable storage medium to another computer-readable storage medium, for example, the computer instructions may be transmitted from a website site, a computer, a server, or a data center to another website site, computer, server, or data center in a wired mode (e.g., a coaxial cable, an optical fiber, a Digital Subscriber Line (DSL)) or a wireless mode (e.g., infrared radiation, radio, microwave). The computer-readable storage medium may be any available medium that the computer can access, or a data storage device such as an integrated server or data center that includes one or more available media. The available medium may be a magnetic medium (e.g., a floppy disk, a hard disk, a magnetic tape), an optical medium (e.g., a Digital Video Disc (DVD)), or a semiconductor medium (e.g., a Solid State Disk (SSD)), or the like.

The purposes, technical solutions and benefits of the implementations of present disclosure are further described in details through the above implementations. It should be understood that the foregoing descriptions are merely specific implementations of the present disclosure, but are not intended to limit the protection scope of implementations of the present disclosure. Any modification, equivalent replacement, or improvement made based on the solutions of the implementations of the present disclosure shall fall within the protection scope of implementations of the present disclosure.

What I claim is:

1. A method for measurement, comprising:
    acquiring a measurement threshold, by a user equipment, wherein the measurement threshold is related to a cell quality and a number of first beams; and
    performing a measurement, by the user equipment, when a measurement threshold requirement is met,
    wherein the first beams are qualified beams having beam qualities higher than a beam quality threshold,
    wherein the measurement threshold is related to a cell quality measurement threshold and an offset,
    wherein the offset is equal to the cell quality measurement threshold*(the number of first beams/a number of second beams),
    wherein the number of second beams is a total number of beams that are actually supported by the cell in which the network device is located, and
    wherein the number of the second beams is more than the number of the first beams.

2. The method of claim 1, wherein when the number of first beams is larger than a first threshold, the measurement threshold is related to a cell quality measurement threshold.

3. The method of claim 1, wherein the measurement threshold comprises a cell quality measurement threshold and a number measurement threshold of beams.

4. The method of claim 3, wherein when the measurement threshold comprises the cell quality measurement threshold and the number measurement threshold of beams, if at least one of a cell quality measurement threshold requirement and a number measurement threshold requirement of beams is met, the user equipment performs the measurement.

5. The method of claim 3, wherein the number measurement threshold of beams is a threshold of the number of first beams satisfying the beam quality threshold, wherein the beam quality threshold is configured by a network device, or the beam quality threshold is predetermined.

6. A user equipment, comprising a processor connected with a memory, wherein the processor is configured to:
    acquire a measurement threshold, wherein the measurement threshold is related to a cell quality and a number of first beams; and
    perform a measurement, by the user equipment, when a measurement threshold requirement is met,
    wherein the first beams are qualified beams having beam qualities higher than a beam quality threshold,
    wherein the measurement threshold is related to a cell quality measurement threshold and an offset,
    wherein the offset is equal to a cell quality measurement threshold*(the number of first beams/a number of second beams),
    wherein the number of second beams is a total number of beams that are actually supported by the cell in which the network device is located, and
    wherein the number of the second beams is more than the number of the first beams.

7. The user equipment of claim 6, wherein when the number of first beams is larger than a first threshold, the measurement threshold is related to a cell quality measurement threshold.

8. The user equipment of claim 6, wherein the measurement threshold comprises a cell quality measurement threshold and a number measurement threshold of beams.

9. The user equipment of claim 8, wherein when the measurement threshold comprises the cell quality measurement threshold and the number measurement threshold of beams, if at least one of a cell quality measurement threshold requirement and a number measurement threshold requirement of beams is met, the user equipment performs the measurement.

10. The user equipment of claim 8, wherein the number measurement threshold of beams is a threshold of the number of first beams satisfying the beam quality threshold, wherein the beam quality threshold is configured by a network device, or the beam quality threshold is predetermined.

11. A measurement method, comprising:
sending a configured measurement threshold, by a network device,
wherein the measurement threshold is related to a cell quality and a number of first beams,
wherein the measurement threshold is used for a user equipment to determine whether to perform a measurement,
wherein the first beams are qualified beams having beam qualities higher than a beam quality threshold,
wherein the measurement threshold is related to a cell quality measurement threshold and an offset,
wherein the offset is equal to the cell quality measurement threshold*(the number of first beams/a number of second beams),
wherein the number of second beams is a total number of beams that are actually supported by the cell in which the network device is located, and
wherein the number of the second beams is more than the number of the first beams.

12. The method of claim 11, wherein when the number of first beams is larger than a first threshold, the measurement threshold is related to a cell quality measurement threshold.

13. The method of claim 11, wherein the measurement threshold comprises a cell quality measurement threshold and a number measurement threshold of beams.

14. The method of claim 13, wherein the number measurement threshold of beams is a threshold of the number of beams satisfying a beam quality threshold, wherein the beam quality threshold is configured by the network device, or the beam quality threshold is predetermined.

* * * * *